April 15, 1958 C. W. SIMPSON 2,830,389
WEED-CUTTING DREDGE SUCTION PIPE
Filed Jan. 24, 1955
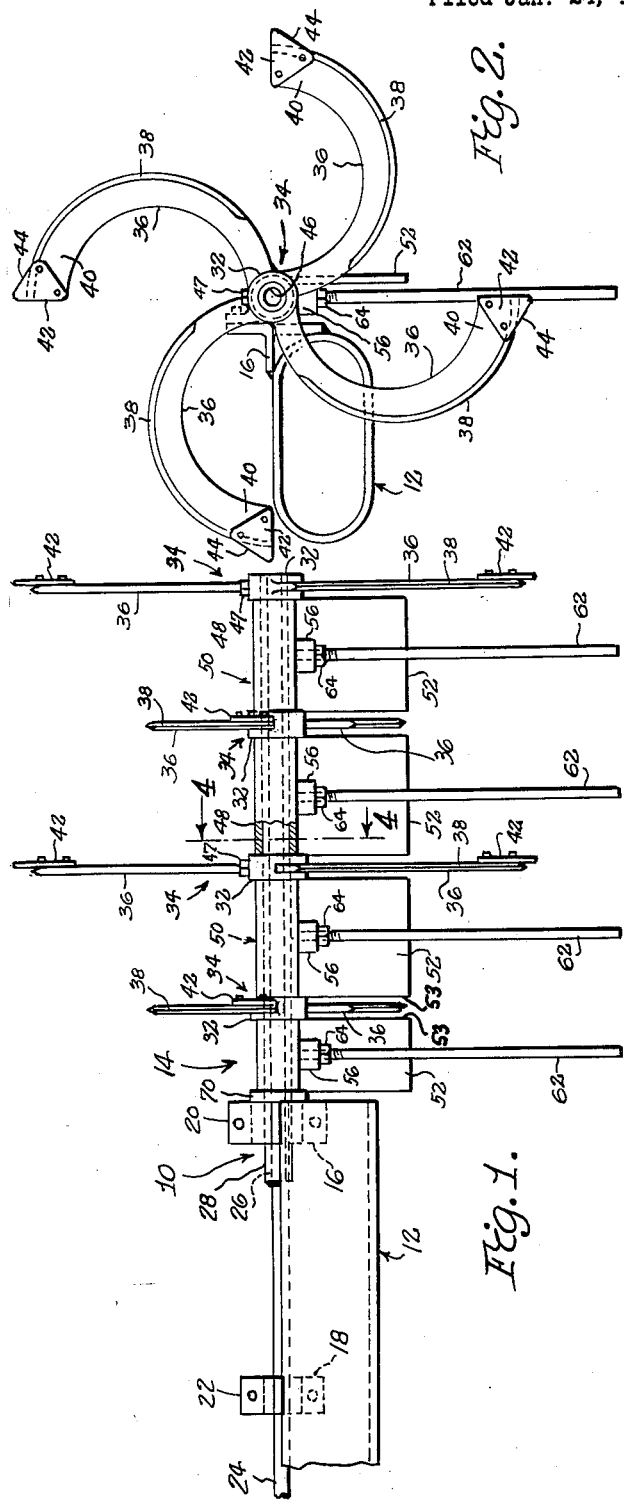
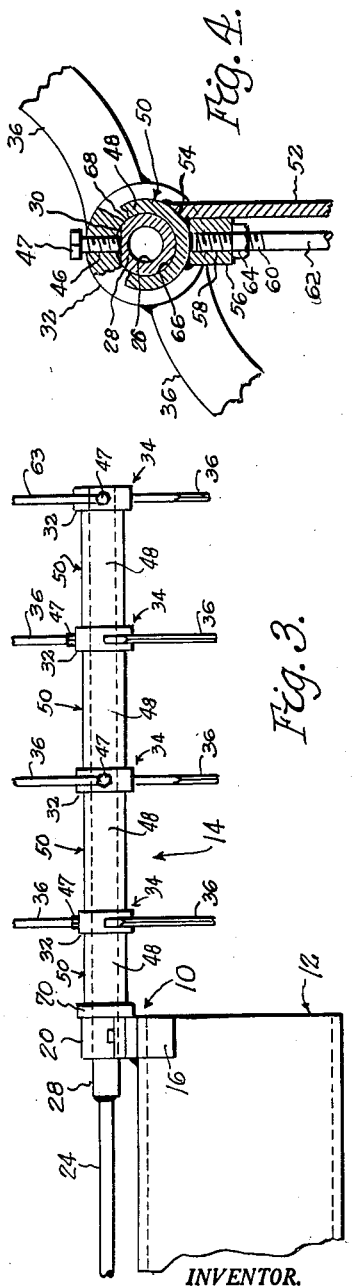
INVENTOR.
Charles W. Simpson
BY Barthel + Bugbee
Attys United States Patent Office 2,830,389
Patented Apr. 15, 1958

2,830,389

WEED-CUTTING DREDGE SUCTION PIPE

Charles W. Simpson, Brighton, Mich.

Application January 24, 1955, Serial No. 483,709

6 Claims. (Cl. 37—58)

This invention relates to dredges and, in particular, to weed-cutting suction pipes for such dredges.

One object of this invention is to provide a weed-cutting dredge suction pipe having a cutter so constructed and arranged as to effectively prevent weeds from being wound up or deposited upon the cutter shaft so as to interfere with the suction at the inlet of the dredge suction pipe, as has occurred with prior cutter-equipped dredge suction pipes.

Another object is to provide a weed-cutting dredge suction pipe wherein a rotary shaft mounted on the dredge suction pipe and extending forwardly therefrom carries spaced rotary cutter blades having shearing abutment devices arranged between them so as to enhance the cutting action upon the weeds as the suction pipe is moved to and fro across the channel or path to be dredged.

Another object is to provide a weed-cutting dredge suction pipe of the foregoing character wherein the shearing abutment devices are pivotally mounted on and suspended from the rotary cutter shaft, elongated rods being also preferably secured to and extending downwardly from the shearing abutment devices so as to serve as counterweights and also to encounter and stall against any banks of weeds which may have caught in the blades momentarily, thereby assisting in causing the weeds to be cut off.

Another object is to provide a weed-cutting dredge suction pipe of the foregoing character wherein the cutter blades are arcuate and are provided at their tips with replaceable supplementary cutters for enhancing the cutting action of the blades.

Other objects and advantages of the invention will become apparent during the course of the following description of the accompanying drawings, wherein:

Figure 1 is a side elevation of the forward end of a weed-cutting dredge suction pipe showing the cutting unit partly in longitudinal section;

Figure 2 is a right-hand end elevation of the weed-cutting dredge suction pipe of Figure 1;

Figure 3 is a top plan view of the weed-cutting dredge suction pipe of Figure 1; and Figure 4 is a cross-section taken along the line 4—4 in Figure 1, but additionally showing the upper portion of the cutter hub in cross-section to illustrate the means of attaching the hub to the hollow cutter shaft.

Hitherto, dredging in weed-infested waters has proved to be a difficult operation, because of the fact that the weeds clog the mouth of the suction pipe of the dredge and prevent it from performing its normal operation of drawing in mud and other matter from the bottom of the waterway being dredged. Prior suction pipes equipped with previously-devised weed cutters have been unsuccessful and many of them have been capable of making only one pass at the weeds before becoming wound up with the weeds and thereby prevented from effectively operating.

For effective operation of the dredge, however, it is essential that the weeds shall be cut away in the path to be dredged, otherwise no progress in dredging can be made. Moreover, it is necessary to cut off the weeds beginning at the top or at the bottom, for otherwise the weeds will merely float and the mud will be dredged out from underneath the weeds so that the suction pipe cannot be raised, due to the unwieldy mass of the wet weeds above the suction pipe. Loose weeds, when once cut, are sucked up by the suction pipe, but the roots of the weeds present a serious problem in dredging unless they are dug up and cut loose from the bottom of the waterway which is being dredged.

The present invention provides a weed-cutting dredge suction pipe wherein shearing abutment devices are arranged between axially-spaced rotary cutter blades so as to form abutments against which the cutter blades force the weeds so as to shear them off in mutual cooperation. The abutment devices are preferably in the form of plates suspended from hubs loosely and swingably mounted upon the cutter shaft, and elongated rods are also preferably provided to enhance the action of the abutment devices, these also serving as counterweights.

Referring to the drawings in detail, Figures 1 to 3 inclusive show the forward end of a weed-cutting dredge suction pipe, generally designated 10, consisting generally of the suction pipe 12 and the weed-cutting assembly 14 mounted thereon to move therewith through the path of dredges. The suction pipe 12 is provided with the usual conventional swinging and hoisting mechanism (not shown), such as hydraulic cylinders, together with the usual pipes or hose (not shown) by which the dredged material is carried ashore and deposited in the desired location. The suction pump or pumps by which suction is created in the suction pipe 12 are also conventional.

Mounted on one side of the suction pipe 12 near its mouth 15 and secured thereto as by welding are forward and rearward brackets 16 and 18 carrying forward and rearward bearing blocks 20 and 22 bolted or otherwise secured thereto. Journaled in the bearing block 22 is a drive shaft 24, the forward end of which is secured in the rearward end of a bore 26 in a hollow cutter shaft 28 having one or more flattened portions or surfaces 30 thereon. The flattened portion 30 may consist of separate axially-spaced flat spots or an elongated flat area running along a considerable part of the hollow shaft 28 (Figure 4). Mounted on and secured to the hollow shaft 28 at axially-spaced locations thereon are the hubs 32 of rotary cutter units, generally designated 34, having arcuate cutting blades 36 thereon. The cutting blades 36 have sharp cutting edges 38 on their convex edges, and at their ends 40 are provided with supplementary cutters 42 bolted or otherwise secured thereto. The cutters 42 are also provided with cutting edges 44 extending into proximity to the cutting edges 38, and are preferably triangular in shape in order to enable the cutters to be attached in the most convenient manner to the cutter blade ends 40. The hubs 32 of the cutter units 34 are provided with threaded radial holes 46 adapted to receive set screws 47, the ends of which engage the flat portions 30 of the hubs 32 in order to prevent rotation of the cutting units 34 relatively to the hollow shaft 28 on which they are mounted.

Loosely and swingably mounted on the hollow shaft 28 between the cutting units 34 are the tubular hubs 48 of shearing abutment devices, generally designated 50. Each such device 50, in addition to the tubular hub 48 just mentioned, consists of a plate 52 (Figure 4) having opposite approximately radial parallel shearing edges 53 and having its upper edge 54 beveled and secured as by welding to the hub 48. Also welded or otherwise secured to the hub 48 adjacent and in engagement with the plate 52 is a boss 56 having a threaded bore 58 adapted to receive the correspondingly threaded upper end portion 60 of a counterweight rod 62 locked in position by a lock nut 64. Each rod 62 may be single or jointed, or rods of various lengths may be provided. The bore 66 in the hub 48 of each shearing abutment device 50 loosely engages the external surface 68 of the hollow shaft 28 so as to cause each device 50 to hang freely without revolving while the shaft 28 revolves. The hubs 48 of the shearing abutment devices 50 at their opposite ends engage the hubs 32 of the cutting units 34 (Figures 1 and 3) except that a washer 70 is mounted at the rearward end of the rearmost device 50 between the latter and the forward bearing block 20.

In the operation of the invention, let it be assumed that the dredge suction pipe 12 has been lowered to the water level by the hoisting apparatus on the barge or boat on which it is mounted, and that it projects forwardly into the weeds growing in the path of the waterway which is to be dredged. Let it also be assumed that the drive shaft 24 is drivingly connected to an engine or other source of power, so that rotation is imparted to the cutter units 34 of the cutting assembly 14. Let it also be assumed that the operator of the dredge starts the swinging mechanism in operation, for example, hydraulic reciprocating motors, in order to swing the dredge suction pipe 12 to and fro horizontally. As the cutting units 34 rotate in response to the rotation of the shafts 24 and 28, their cutting edges 38 engage the weeds and sever them from their stems or roots, aided by the triangular supplementary cutters 42 at the ends of the blades 36.

Consequently, as the suction pipe 12 moves to and fro, its cutting assembly 14 cuts a swath through the weeds, severing them from their roots and preventing clogging of the mouth 15 of the suction pipe 12. If the weeds are of exceptionally great length, the operator lowers the suction pipe 12 to a lower level and again cuts a swath through the weeds and, if the cutting unit 12 is sufficiently close to the bottom of the waterway, the supplementary cutting blades 44 also dig up and sever the roots of the weeds from their tendrils.

If, however, the weeds are of such exceptional thickness as to resist severing by the cutting blades 36 alone, and are drawn in the direction of rotation of the cutting units 34 without severing, the weeds come into collision with the shear plates 52 and are caused to be sheared between the cutting blade edges 38 and the approximately radial shearing edges 53 of the shear plates 52. The rods 62 serve as counterweights to tend to hold the shear plates 52 in vertical positions but if the resistance of the weeds is excessively great, the shearing abutment devices 50 will yield and rotate temporarily until cutting takes place. Furthermore, the rods 62 after one rotation will usually dig into the bank of weeds or into the bottom sufficiently to cause shearing of the weeds to take place. If, however, a strong rigid object, such as a log, piece of pipe or other object is encountered, it will be caught between the blades 36 and the shear plates 52 or rods 62, which will rotate harmlessly until the obstruction is seen and removed. By reason of this construction, no damage will be done, as would be the case if counter-rotating cutting units were employed, as in the prior art.

What I claim is:

1. In combination with a dredge suction pipe, a shaft rotatably mounted on said pipe and projecting forwardly therefrom, a cutting blade mounted transversely on said shaft and drivingly connected thereto, and a shearing abutment loosely and swingably mounted on said shaft, said abutment being disposed transversely to said shaft adjacent said cutting blade and having a shearing edge disposed in shearing relationship therewtih.

2. In combination with a dredge suction pipe, a shaft rotatably mounted on said pipe and projecting forwardly therefrom, a cutting blade mounted transversely on said shaft and drivingly connected thereto, and a shearing abutment loosely and swingably mounted on said shaft and depending therefrom, said abutment being disposed transversely to said shaft adjacent said cutting blade and having a shearing edge disposed in shearing relationship therewith.

3. In combination with a dredge suction pipe, a shaft rotatably mounted on said pipe and projecting forwardly therefrom, a cutting blade mounted transversely on said shaft and drivingly connected thereto, a shearing abutment loosely and swingably mounted on said shaft, said abutment being disposed transversely to said shaft adjacent said cutting blade and having a shearing edge disposed in shearing relationship therewith, and an elongated couunterweight member connected to said abutment in depending relationship with said shaft.

4. In combination with a dredge suction pipe, a shaft rotatably mounted on said pipe and projecting forwardly therefrom, a plurality of cutting blades mounted on said shaft in axially-spaced relationship therewith and drivingly connected thereto, and shearing abutments loosely and swingably mounted on said shaft, said abutments being disposed in the spaces between said blades and having shearing edges disposed in shearing relationship with said blades.

5. In combination with a dredge suction pipe, a shaft rotatably mounted on said pipe and projecting forwardly therefrom, a plurality of cutting blades mounted on said shaft in axially-spaced relationship therewith and drivingly connected thereto, and shearing abutments loosely and swingably mounted on said shaft and depending therefrom, said abutments being disposed in the spaces between said blades and having shearing edges disposed in shearing relationship with said blades.

6. In combination with a dredge suction pipe, a shaft rotatably mounted on said pipe and projecting forwardly therefrom, a plurality of cutting blades mounted on said shaft in axially-spaced relationship therewith and drivingly connected thereto, shearing abutments loosely and swingably mounted on said shaft, said abutments being disposed in the spaces between said blades and having shearing edges disposed in shearing relationship with said blades, and an elongated counterweight member connected to each abutment in depending relationship with said shaft.

References Cited in the file of this patent
UNITED STATES PATENTS

| | | |
|---|---|---|
| 1,159,937 | Hart et al. | Nov. 9, 1915 |
| 2,670,775 | Elofson | Mar. 2, 1954 |